United States Patent [19]
Motosugi et al.

[11] 4,261,316
[45] Apr. 14, 1981

[54] INTAKE SYSTEM OF A MULTI-CYLINDER INTERNAL COMBUSTION ENGINE

[75] Inventors: Katsuhiko Motosugi; Shuhei Toyoda; Hiroshi Takahashi, all of Toyota, Japan

[73] Assignee: Toyota Jidosha Kogyo Kabushiki Kaisha, Toyota, Japan

[21] Appl. No.: 35,984

[22] Filed: May 4, 1979

[30] Foreign Application Priority Data

Aug. 10, 1978 [JP] Japan .................................. 53-97597

[51] Int. Cl.³ ........................ F02B 47/08; F02G 5/00; F02M 15/00
[52] U.S. Cl. .................................... 123/568; 123/547; 123/543
[58] Field of Search ............. 123/122 AB, 52 M, 127, 123/568, 547, 543

[56] References Cited
U.S. PATENT DOCUMENTS

| 2,257,629 | 9/1941 | Wahlberg | 123/122 AB |
| 3,364,911 | 1/1968 | Baudry et al. | 123/52 M |
| 3,408,992 | 11/1968 | Von Seggern et al. | 123/52 M X |
| 3,441,008 | 4/1969 | Nelson | 123/52 M |
| 3,664,316 | 5/1972 | Garcea | 123/52 M |

Primary Examiner—Wendell E. Burns

[57] ABSTRACT

A multi-cylinder engine comprising a carburetor housing forming therein at least two branch mixture passages. Each of the branch mixture passages is connected to a respective intake port. A throttle valve of the carburetor is provided for each cylinder. Each of the throttle valves is arranged in the respective branch mixture passage. A single common connecting passage and branch connecting passages which are connected to the common connecting passage are provided. Each of the branch connecting passages opens into the respective intake port in the vicinity of the rear face of the valve head of the corresponding intake valve. The common connecting passage is arranged adjacent to the exhaust port for heating the inner wall of the common connecting passage by the exhaust gas flowing in the exhaust port.

16 Claims, 5 Drawing Figures

INTAKE SYSTEM OF A MULTI-CYLINDER INTERNAL COMBUSTION ENGINE

DESCRIPTION OF THE INVENTION

The present invention relates to an intake system of a multi-cylinder internal combustion engine.

Particularly in a gasoline engine, in order to obtain a high output power of the engine by increasing the volumetric efficiency when the engine is operating at a high speed under a heavy load, the shape of each intake port is so constructed that the intake port has as small a flow resistance as possible. In the case wherein the intake port has such a shape, since a considerably strong turbulence is spontaneously created in the combustion chamber of the engine when the engine is operating at a high speed under a heavy load, the burning velocity is sufficiently increased. However, when the same engine is operating at a low speed, a satisfactory strong turbulence is not created in the combustion chamber, thus resulting in a problem in that a sufficient increase in the burning velocity is not obtained.

As a method of creating a strong turbulence in the combustion chamber when an engine is operating at a low speed, there is a method of compulsorily creating a swirl motion in the combustion chamber by using a helically-shaped intake port or by using a shroud valve. However, in the case wherein such a method is adopted, since the mixture fed into the cylinder is subjected to increased flow resistance, a problem occurs in that the volumetric efficiency is reduced when an engine is operating at a high speed under a heavy load. In addition, an engine capable of creating a strong turbulence in the combustion chamber has been proposed which comprises a plurality of channel branches each interconnecting the corresponding intake port with a common connecting passage. In this engine, due to the pressure difference between the pressure and the vacuum produced in the intake ports, the mixture is fed from the intake port of a given cylinder into the intake port of the other cylinder which is in the intake stroke via the common connecting passage, and the mixture is spouted into the intake port of the cylinder which is in the intake stroke from the corresponding channel branch at a high speed. In this engine, since the vaporization of the liquid fuel contained in the mixture is promoted during the time the mixture flows within the common connecting passage, a good combustion can be obtained. However, in this engine, since the temperature of the inner wall of the common connecting passage is relatively low, a satisfactory vaporization of the liquid fuel cannot be obtained. Particularly when the fuel for idling is fed into the common connecting passage, it is necessary to positively promote the vaporization of the liquid fuel within the common connecting passage. In addition, if the temperature of the inner wall of the common connecting passage is low in the case wherein the exhaust gas is recirculated into the common connecting passage, the inner wall of the common connecting passage is corroded by the water contained in the exhaust gas and, thus, the thickness of the oxide film formed on the inner wall of the common connecting passage is gradually increased. In addition, since carbon particles contained in the exhaust gas adhere onto the inner wall of the common connecting passage, a problem occurs in that the cross-sectional area of the common connecting passage is gradually reduced.

An object of the present invention is to provide an internal combustion engine capable of additionally promoting the vaporization of the liquid fuel within the common connecting passage and preventing the cross-sectional area of the common connecting passage from being reduced.

According to the present invention, there is provided a multi-cylinder internal combustion engine, each cylinder having a combustion chamber and an intake valve which has a valve head, said engine comprising:

at least one intake passage common to at least two cylinders and comprising a collecting portion having an inlet and at least two branch intake passages branched off from said collecting portion, each of said branch intake passages being connected to its respective combustion chamber via the corresponding intake valve;

fuel supply means arranged in the inlet of said collecting portion;

a common connecting passage;

at least two branch connecting passages each being connected to said common connecting passage and having an opening which opens into a respective one of said branch intake passages;

valve means arranged in each of said branch intake passages at a position upstream of the opening of the respective one of said branch connecting passages and opened in accordance with an increase in the level of the load of said engine; and heating means arranged adjacent to said common connecting passage for heating said common connecting passage by an exhaust gas discharged from the engine.

The present invention may be more fully understood from the description of preferred embodiments of the invention set forth below, together with the accompanying drawings.

DESCRIPTION OF THE PREFERRED EMBODIMENTS

Figure 1:
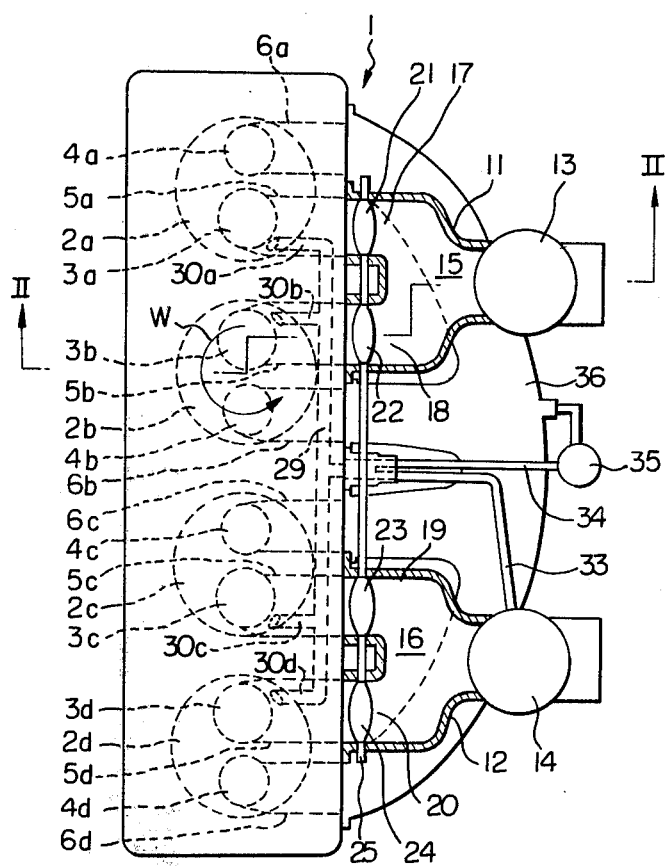
FIG. 1 is a plan view, partly in cross section, of an embodiment of an engine according to the present invention.
Figure 2:
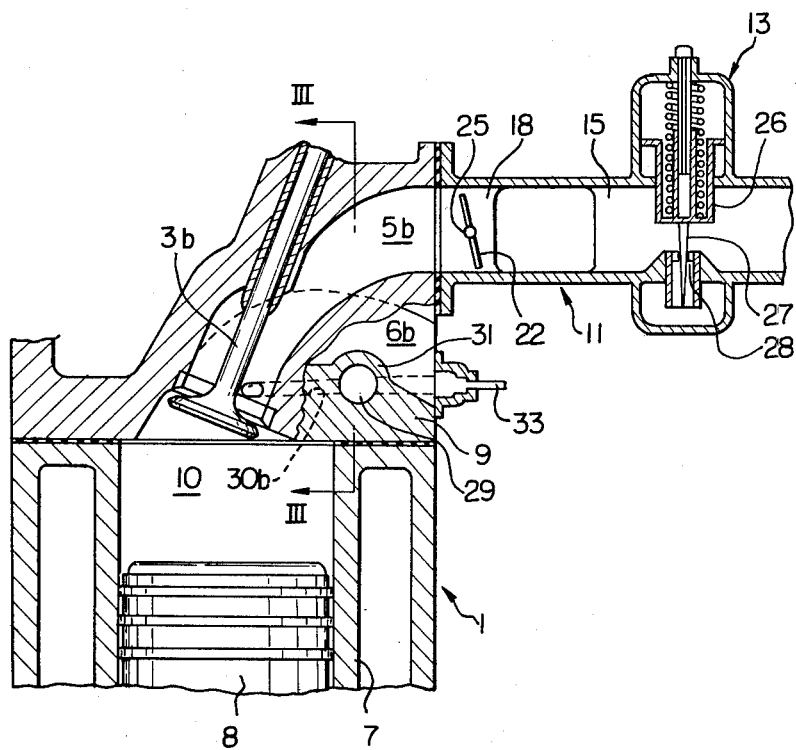
FIG. 2 is a cross-sectional side view taken along the line II—II in FIG. 1.

Referring to FIG. 1, 1 designates an engine body; 2a, 2b, 2c, 2d designate No. 1 cylinder, No. 2 cylinder, No. 3 cylinder and No. 4 cylinder, respectively; 3a, 3b, 3c, 3d designate intake valves; 4a, 4b, 4c, 4d designate exhaust valves; 5a, 5b, 5c, 5d designate intake ports; and 6a, 6b, 6c, 6d designate exhaust ports. Referring to FIG. 2, reference numeral 7 designates a cylinder block, 8 a piston which is reciprocally movable in the cylinder block 7, 9 a cylinder head fixed onto the cylinder block 7, and 10 a combustion chamber. The spark plug (not shown) is arranged in the combustion chamber 10.

Referring to FIGS. 1 and 2, a pair of carburetor housings 11, 12 is mounted on the engine body 1, and variable venturi type carburetor bodies 13, 14 are arranged in the carburetor housings 11, 12, respectively. Each of the intake passages such as mixture passages 15, 16 formed in the carburetor housings 11, 12 is divided into two respective branch intake passages such as branch mixture passages 17 and 18 for the mixture passage 15 and branch mixture passages 19 and 20 for mixture passage 16, and each of the branch mixture passages 17, 18, 19, 20 is respectively connected to one of the intake ports 5a, 5b, 5c, 5d. Throttle valves 21, 22, 23, 24 of the carburetor bodies 13, 14 are arranged in the corresponding branch mixture passages 17, 18, 19, 20 and are attached onto a common valve shaft 25. However, instead of being attached onto the common valve shaft 25, the throttle valves 21, 22, 23, 24 may be more indirectly interconnected to each other by means of a link mechanism (not shown) so that the opening operation of all the throttle valves 21, 22, 23, 24 is controlled at the same time. As is illustrated in FIG. 2, the carburetor body 13 comprises a movable suction piston 26, a movable needle 27 and a metering jet 28. As is well known to those skilled in the art, the suction piston 26 moves up and down so that the vacuum produced in the mixture passage 15 located between the suction piston 26 and the throttle valve 22 is maintained at a constant level.

Figure 3:
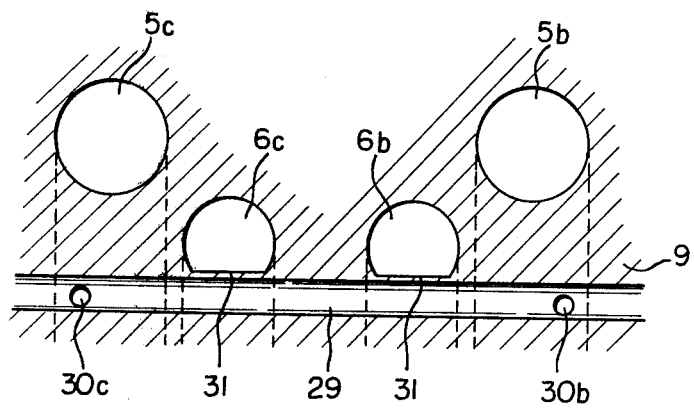
FIG. 3 is a cross-sectional view taken along the line III—III in FIG. 2.

As is illustrated in FIGS. 1 through 3, a common connecting passage such as channel 29 extending straight along the longitudinal direction of the engine body 1 and having a cross-section which is much smaller than that of the branch mixture passages 17, 18, 19, 20 is formed in the cylinder head 9 beneath the intake ports 5a, 5b, 5c, 5d. As is illustrated in FIGS. 2 and 3, the common connecting channel 29 is arranged adjacent to the exhaust ports 6b and 6c via thin walls 31. Consequently, the mixture flowing within the common connecting channel 29 is strongly heated by the exhaust gas flowing in the exhaust ports 6b and 6c. As is illustrated in FIGS. 1 and 2, four branch connecting passages such as channel branches 30a, 30b, 30c, 30d which are in communication with the common connecting channel 29 and which have a cross-section much smaller than that of the branch mixture passages 17, 18, 19, 20 are formed in the cylinder head 9, and the channel branches 30a, 30b, 30c, 30d open into the intake ports 5a, 5b, 5c, 5d at a position near the rear faces of the valve heads of the corresponding intake valves 3a, 3b, 3c, 3d, respectively. The openings of the channel branches 30a, 30b, 30c, 30d are directed to valve gaps formed between the corresponding intake valves 3a, 3b, 3c, 3d and their valve seats when the intake valves 3a, 3b, 3c, 3d are opened, respectively.

As is illustrated in FIG. 1, the central portion of the common connecting channel 29 is connected to the carburetor body 14 via a fuel supply conduit 33, on one hand, and connected to an exhaust manifold 36 via a recirculated exhaust gas (hereinafter referred to as an EGR gas) feed conduit 34 and an EGR gas feed control valve 35, on the other hand. The fuel for idling is fed into the common connecting channel 29 from the fuel feed conduit 33 at the time of idling and, in addition, the EGR gas is recirculated into the common connecting channel 29 from the EGR gas feed conduit 34. However, instead of connecting the EGR gas feed conduit 34 to the common connecting channel 29, the EGR gas feed conduit 34 may be connected to the mixture passages 15, 16 for feeding the EGR gas into the mixture passages 15, 16.

Figure 5:
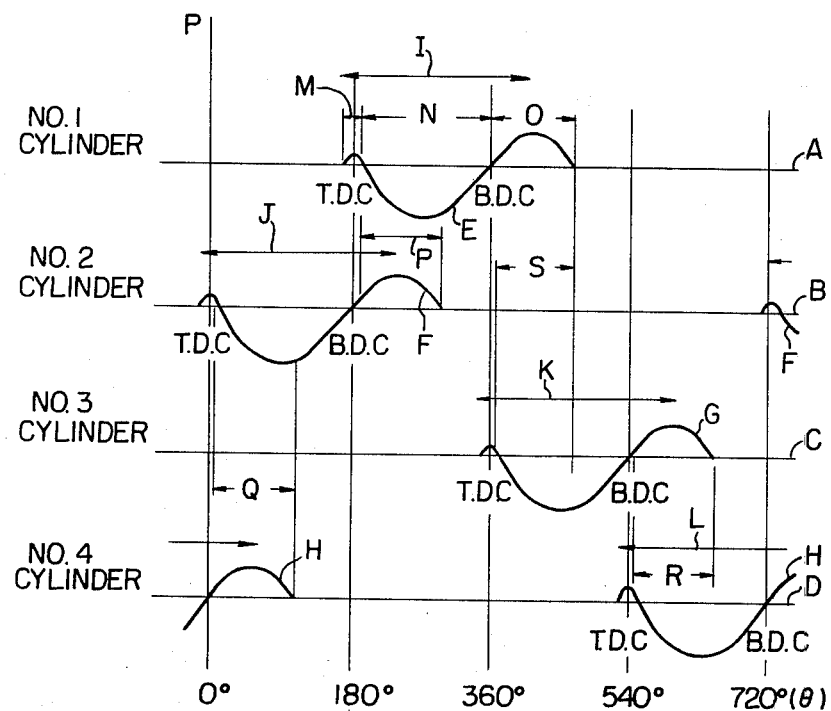
FIG. 5 is a graph showing changes in pressure in the intake port located at a position near the rear face of the valve head of the intake valve.

FIG. 5 illustrates changes in pressure in the intake ports 5a, 5b, 5c, 5d. In FIG. 5, the abscissa $\theta$ indicates crank angle, and the ordinate P indicates pressure in the intake port in the vicinity of the rear face of the valve head of the intake valve (hereinafter referred to as an intake port pressure). In addition, each of the reference lines A, B, C, D indicates the atmospheric pressure. Furthermore, in FIG. 5, the curved lines E, F, G and H indicate changes in the intake port pressure in the intake ports 5a, 5b, 5c and 5d, respectively, and the arrows I, J, K and L indicate the opening duration of the intake valves 3a, 3b, 3c and 3d, respectively. Referring to the change in pressure in the No. 1 cylinder shown in FIG. 5, the intake port pressure becomes a positive pressure over the range M of the crank angle immediately after the intake valve is opened, and then a vacuum is produced in the intake port of the No. 1 cylinder over the range N of the crank angle in which the piston moves downwards. After this, the intake port pressure again becomes a positive pressure over the range O of the crank angle after the piston begins to move upwards. The change in the intake port pressure in the remaining cylinders is the same as that in the intake port pressure in the No. 1 cylinder. Consequently, referring to the range P of the crank angle of the No. 1 cylinder and No. 2 cylinder shown in FIG. 5, it will be understood that a vacuum is produced in the intake port of the No. 1 cylinder, and that, at this time, the intake port pressure of the No. 2 cylinder is positive. In addition, from FIG. 5 it will be understood that, referring to the range Q of the crank angle of the No. 2 cylinder and No. 4 cylinder, a vacuum is produced in the intake port of the No. 2 cylinder and, at this time, the intake port pressure of the No. 4 cylinder is positive;

referring to the range R of the crank angle of the No. 3 cylinder and the No. 4 cylinder, a vacuum is produced in the intake port of the No. 4 cylinder and, at this time, the intake port pressure of the No. 3 cylinder is positive; and referring to the range S of the crank angle of the No. 1 cylinder and the No. 3 cylinder, a vacuum is produced in the intake port of the No. 3 cylinder and, at this time, the intake port pressure of the No. 1 cylinder is positive.

Consequently, referring to the No. 1 cylinder and the No. 2 cylinder shown in FIG. 5, it will be understood that, in the first half of the intake stroke of the No. 1 cylinder, the mixture in the intake port 5b of the No. 2 cylinder is fed into the intake port 5a of the No. 1 cylinder via the channel branch 30b, the common connecting channel 29 and the channel branch 30a due to the pressure difference between the vacuum in the intake port 5a and the positive pressure in the intake port 5b. In the same manner as described above, when the No. 2 cylinder is in the intake stroke, the mixture in the intake port 5d of the No. 4 cylinder is fed into the intake port 5b of the No. 2 cylinder via the channel branch 30d, the common connecting channel 29 and the channel branch 30b;

when the No. 4 cylinder is in the intake stroke, the mixture in the intake port 5c of the No. 3 cylinder is fed into the intake port 5d of the No. 4 cylinder via the channel branch 30c, the common connecting channel 29 and the channel branch 30d; and when the No. 3 cylinder is in the intake stroke, the mixture in the intake port 5a of the No. 1 cylinder is fed into the intake port 5c of the No. 3 cylinder via the channel branch 30a, the common connecting channel 29 and the channel branch 30c.

As mentioned above, due to the pressure difference between the intake port pressures in the intake ports 5a, 5b, 5c, 5d, the mixture is spouted from the channel branches 30a, 30b, 30c, 30d of the cylinder which is in the intake stroke into the corresponding intake ports 5a, 5b, 5c, 5d at a high speed.

In operation, the mixtures formed in the carburetor bodies 13, 14 are fed into the intake ports 5a, 5b, 5c, 5d via the corresponding mixture passages 15, 16. Assuming that the No. 2 cylinder 2b is now in the intake stroke, the mixture is spouted from the channel branch 30b into the intake port 5b at a high speed as mentioned above. At this time, the mixture flowing within the common connecting channel 29 is heated by the exhaust gas via the thin walls 31 and, as a result, the vaporization of the liquid fuel is promoted. As mentioned previously, since the opening of the channel branch 30b is directed to the valve gap formed between the intake valve 3b and its valve seat when the intake valve 3b is opened, the mixture spouted from the channel branch 30b passes through the above-mentioned valve gap and then flows into the combustion chamber 10 at a high speed. As a result, the mixture flowing into the combustion chamber 10 causes a swirl motion shown by the arrow W in FIG. 1 in the combustion chamber 10. As a result of this swirl motion, burning velocity is considerably increased and a stable combustion can thus be obtained. In addition, since the inner wall of the common connecting channel 29 is maintained at a high temperature by the heating operation of the exhaust gas, the fuel for idling, which is fed into the common connecting channel 29, is rapidly vaporized. In addition, even if the EGR gas is fed into the common connecting channel 29, there is no danger that the inner wall of the common connecting channel 29 will be corroded and that carbon particles contained in the exhaust gas will adhere onto the inner wall of the common connecting channel 29.

Figure 4:
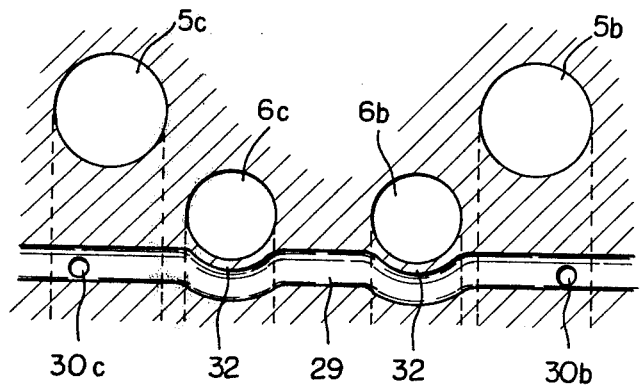
FIG. 4 is a cross-sectional view of an alternative embodiment according to the present invention.

The common connecting channel 29 extending straight in the cylinder head 9, as is illustrated in FIG. 3, can be easily formed by machining. However, as is illustrated in FIG. 4, the common connecting channel 29 may be so formed that a part thereof extends along the thin walls 32 which form a portion of the circular inner walls of the exhaust ports 6c, 6d.

As is illustrated in FIGS. 1 and 2, by positioning the throttle valves 21, 22, 23, 24 at the outlets of the branch mixture passages 17, 18, 19, 20, the positive pressure which is caused by blowing the mixture back into the intake port is maintained without being attenuated. As a result of this, since the pressure difference between the positive pressure and the vacuum which acts on the openings of the channel branches 30a, 30b, 30c, 30d is maintained at a large value for a long time, it is possible to produce an extremely strong swirl motion in the combustion chamber 10.

According to the present invention, by forming the common connecting channel so that the inner wall thereof is heated by the exhaust gas, the vaporization of the liquid fuel can be promoted within the common connecting channel. In addition, the inner wall of the common connecting channel can be prevented from being corroded, and carbon particles can be prevented from adhering onto the inner wall of the common connecting channel. As a result of this, since a strong swirl motion can be always obtained even after an engine has been used for a long time, the burning velocity can be increased independently of the engine speed when an engine is operating under a light load while ensuring a high volumetric efficiency when the engine is operating at a high speed under a heavy load.

While the invention has been described with reference to specific embodiments chosen for purposes of illustration, it should be apparent that numerous modifications could be made thereto by those skilled in the art without departing from the spirit and scope of the invention.

What is claimed is:

1. A multi-cylinder internal combustion engine having a plurality of cylinders, each having a combustion chamber and an intake valve which has a valve head, said enging comprising:

at least one intake pressure common to at least two cylinders and comprising a collecting portion having an inlet and at least two branch intake passages branched off from said collecting portion, each of said branch intake passages being connected to a respective one of said combustion chambers via a corresponding one of said intake valves;

fuel supply means arranged in the inlet of said collecting portion;

a common connecting passage;

at least two branch connecting passages each being connected to said common connecting passage and each having a separate opening which opens into said respective branch intake passage adjacent the valve head in the respective combustion chamber;

valve means arranged in said branch intake passages at a position upstream of the openings of said branch connecting passages and opened in accordance with an increase in the level of the load of said engine; and heating means arranged adjacent to said common connecting passage for heating said common connecting passage by an exhaust gas discharged from the engine.

2. A multi-cylinder internal combustion engine as claimed in claim 1, wherein said heating means comprises an exhaust passage communicating the combustion chamber with the atmosphere, said exhaust passage being arranged adjacent to said common connecting passage.

3. A multi-cylinder internal combustion engine as claimed in claim 2, comprising a thin wall forming a heat-transferring barrier between said exhaust passage and said common connecting passage.

4. A multi-cylinder internal combustion engine as claimed in claim 3, wherein said common connecting passage extends straight alongside all of the cylinders having their respective combustion chambers connected thereto.

5. A multi-cylinder internal combustion engine as claimed in claim 3, wherein said exhaust passage has an inner wall of a circular cross-section, said exhaust passage comprising an inner wall and said thin wall forming a portion of the inner wall of said exhaust passage.

6. A multi-cylinder internal combustion engine as claimed in claim 1, wherein said common connecting passage is connected to said fuel supply means for feeding fuel for idling into said common connecting passage.

7. A multi-cylinder internal combustion engine as claimed in claim 1, wherein said engine further comprises an exhaust system, said common connecting passage being connected to said exhaust system for recirculating the exhaust gas into said common connecting passage.

8. A multi-cylinder internal combustion engine as claimed in claim 1, wherein said common connecting passage has a cross-section which is smaller than that of said branch intake passage.

9. A multi-cylinder internal combustion engine as claimed in claim 1, wherein each of said branch connecting passages has a cross-section which is smaller than that of said branch intake passage.

10. A multi-cylinder internal combustion engine as claimed in claim 1, wherein the opening of each of said branch connecting passages is arranged in the vicinity of the valve head of its corresponding intake valve.

11. A multi-cylinder internal combustion engine as claimed in claim 10, wherein the opening of each of said branch connecting passages is directed to a valve gap formed between said corresponding intake valve and a valve seat thereof when said intake valve is opened.

12. A multi-cylinder internal combustion engine as claimed in claim 1, wherein said valve means comprises at least two throttle valves, each being arranged in a respective one of said branch intake passages.

13. A multi-cylinder internal combustion engine as claimed in claim 12, wherein said throttle valves are attached onto a common throttle shaft.

14. A multi-cylinder internal combustion engine as claimed in claim 12, wherein each of said throttle valves is arranged at a position near a respective one of said intake valves.

15. A multi-cylinder internal combustion engine as claimed in claim 14, wherein said engine further comprises at least one carburetor housing forming therein at least two mixture passages, each having an outlet which is connected to a respective combustion chamber via a corresponding intake valve, each of said throttle valves being arranged in the outlet of its respective mixture passage.

16. A multi-cylinder internal combustion engine as claimed in claim 1, wherein said engine further comprises an exhaust system, and said exhaust system is connected to said collecting portion for recirculating the exhaust gas into said collecting portion.

* * * * *

UNITED STATES PATENT AND TRADEMARK OFFICE
CERTIFICATE OF CORRECTION

PATENT NO. : 4,261,316
DATED : April 14, 1981
INVENTOR(S) : Motosugi et al

It is certified that error appears in the above—identified patent and that said Letters Patent is hereby corrected as shown below:

Column 2, line 40, change "cross section" to --cross-section--.

Column 6, line 11, after "said" change "enging" to --engine--.

Column 6, line 12, after "intake" change "pressure" to --passage--.

Signed and Sealed this

Twenty-ninth Day of December 1981

[SEAL]

Attest:

GERALD J. MOSSINGHOFF

Attesting Officer    Commissioner of Patents and Trademarks